(12) United States Patent
Zhou et al.

(10) Patent No.: US 12,510,455 B2
(45) Date of Patent: Dec. 30, 2025

(54) METHOD FOR PREPARING POROUS ROCK AND METHOD FOR QUANTITATIVELY RESEARCHING LOW-AMPLITUDE WAVE PROPAGATION BY USING THE POROUS ROCK

(71) Applicant: Shenzhen University, Shenzhen (CN)

(72) Inventors: Tao Zhou, Shenzhen (CN); Junfeng Tan, Shenzhen (CN); Jianbo Zhu, Shenzhen (CN); Heping Xie, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/202,849

(22) Filed: May 8, 2025

(65) Prior Publication Data
US 2025/0369855 A1    Dec. 4, 2025

(30) Foreign Application Priority Data

May 29, 2024  (CN) .......................... 202410674549.2

(51) Int. Cl.
*G01N 15/08* (2006.01)
*G01N 1/28* (2006.01)
(Continued)

(52) U.S. Cl.
CPC ........... *G01N 15/0806* (2013.01); *G01N 1/28* (2013.01); *G01N 15/088* (2013.01);
(Continued)

(58) Field of Classification Search
CPC .... G01N 15/0806; G01N 1/28; G01N 15/088; G01N 29/043; G01N 2113/10; G06F 2113/10; G06F 30/20
(Continued)

(56) References Cited

U.S. PATENT DOCUMENTS 8,311,788 B2 * 11/2012 Hurley .................... G06T 17/00
                                                      703/10
8,725,477 B2 *  5/2014 Zhang .................... E21B 49/00
                                                     73/152.02
(Continued)

FOREIGN PATENT DOCUMENTS

CN   105261068 B   1/2016
CN   106568846 B   4/2017
(Continued)

OTHER PUBLICATIONS 3D digital rock modeling of the fractal properties of pore structures, Miao Luo et al. Sep. 16, 2020. (Year: 2020).*

(Continued)

*Primary Examiner* — Jacques M Saint Surin
(74) *Attorney, Agent, or Firm* — Birchwood IP

(57) ABSTRACT

The invention provides a method for preparing a porous rock and a method for quantitatively researching low-amplitude wave propagation by using the porous rock. The invention also provides a method for testing a low-amplitude ultrasonic wave propagation law of the rock by quantitatively researching a pore characteristic of the rock sample prepared by the method for preparing the porous rock. The invention solves a problem that high-precision, repeated and batch customization of rock-like porous medium samples is difficult, and improves precision of quantitatively researching the porous characteristic of the low-amplitude ultrasonic wave propagation law of the rock.

8 Claims, 14 Drawing Sheets

(51) Int. Cl.
  *G01N 29/04* (2006.01)
  *G01N 33/24* (2006.01)
  *G06F 30/20* (2020.01)
  *G06F 113/10* (2020.01)

(52) U.S. Cl.
  CPC ........... *G01N 29/043* (2013.01); *G01N 33/24* (2013.01); *G06F 30/20* (2020.01); *G06F 2113/10* (2020.01)

(58) Field of Classification Search
  USPC ........................................................ 73/865.6
  See application file for complete search history.

(56) References Cited

U.S. PATENT DOCUMENTS 9,134,457 B2 * 9/2015 Hurley .................. G01V 20/00
9,180,010 B2 * 11/2015 Dong .................... B23K 26/342
10,380,755 B2 * 8/2019 Mulukutla ............. G06T 17/20

FOREIGN PATENT DOCUMENTS

| CN | 109648693 A | 4/2019 |
| CN | 113656946 B | 11/2021 |
| CN | 115203900 B | 10/2022 |

OTHER PUBLICATIONS

A novel 3D geometrical reconstruction model for porous rocks, Zhou et al. Sep. 1, 2017. (Year: 2017).*

BI Guiquan, etc., Experimental Study on Characteristics of Wave Propagation in Media Containing Intermittent Cracks , Chinese Journal of Rock Mechanics and Engineering, vol. 28, May 31, 2009 (May 31, 2009), pp. 3116-3123.

* cited by examiner

METHOD FOR PREPARING POROUS ROCK AND METHOD FOR QUANTITATIVELY RESEARCHING LOW-AMPLITUDE WAVE PROPAGATION BY USING THE POROUS ROCK

CROSS-REFERENCE TO RELATED APPLICATIONS

This application claims priority to Chinese Patent Application No. 202410674549.2, filed on May 29, 2024, which is hereby incorporated by reference in its entirety.

TECHNICAL FIELD

The present invention relates to the technical field of preparing rock ultrasonic wave propagation test samples, in particular to a method for preparing a porous rock, and also relates to a method for quantitatively researching a low-amplitude ultrasonic wave propagation law of the rock by using a rock sample prepared by the method for preparing the porous rock.

BACKGROUND

Low-amplitude ultrasonic wave test is a commonly used nondestructive testing method for rock internal structure at present. The low-amplitude ultrasonic wave propagation test of the rock is helpful for us to understand propagation and attenuation laws of low-amplitude ultrasonic waves by pore internal structure, and then better guide practical geotechnical engineering. At present, methods of preparing samples for low-amplitude ultrasonic wave propagation test of rocks mainly comprise: carrying out processing, artificial pouring synthesis and 3D printing that meet the test requirements on natural rocks. A preparation method of directly processing the natural rock has the following problems: a sample preparation process is complex, a processing accuracy of samples is difficult to control, similarity, uniformity and repeatability of the samples cannot be guaranteed, and a sample preparation efficiency is relatively low. There are also corresponding problems in a sample preparation method by artificial pouring synthesis. 3D printing technology can quickly and accurately prepare samples in batches with low discreteness, which can improve the sample preparation efficiency.

3D modeling is an important step in the process of preparing samples by 3D printing. However, a traditional modeling method is not efficient for establishing 3D models with arbitrary spatial distribution of pores. At present, methods for establishing three-dimensional models with arbitrary spatial distribution of pores by using three-dimensional modeling software, such as Autodesk Fusion360, Blender, Rhino 3D, or the like, may be roughly divided into two:

(1) After a complete sample is established, Boolean operation is performed on a solid model of the complete sample, that is, a target number of geometric models are manually added to the solid model and a corresponding Boolean operation is performed, and then shapes, sizes and positions of the pores are manually adjusted.

(2) API supported by 3D modeling software may be connected with supported programming software thereof to call relevant script codes and obtain the required model.

Although the method (2) has a certain degree of automation and has improved modeling efficiency in comparison to the direct use of three-dimensional modeling software, but this method also has shortcoming. Firstly, the API connection may be limited by software version and compatibility. Different versions of three-dimensional modeling software may have different APIs, and with the update of the software, the API interface may change. Therefore, modeling in this way needs to ensure that a script written can run normally on a specific version of software and adapt to the software in time when the software is updated. In addition, calling software functions may be restricted by limitations of software functions. Although the API provides some basic functions, in some cases, it may not meet the specific requirements of complex model generation. This may require developers to make up for the deficiency of these functions through more complex logic and algorithms, which increases the complexity and workload of code development. Meanwhile, it may be necessary to manually operate or call API interfaces many times when generating models with specific laws in large quantities.

Therefore, under an application scenario of carrying out a quantitative research on a wave propagation law of a porous rock, developing one software that can automatically generate sample models with complex pore structures only by inputting sample model parameters can not only avoid the limitation of software API, but also improve an efficiency of complex model modeling stage, which, in combination with the advantages of 3D printing technology, can greatly improve the efficiency of the whole sample preparation process and solve a problem that high-precision, repeated and batch customization of rock-like porous medium samples is difficult.

At present, the research of rock wave propagation test mostly stays in qualitative angle, and a test research accuracy of quantitatively analyzing the low-amplitude ultrasonic wave propagation law of porous rock from the perspective of pore characteristics is relatively low. This is because that the rock is a heterogeneous material, and an internal pore size and spatial distribution thereof are random, so it is difficult to guarantee complete repetition. Moreover, the traditional rock sample preparation method is insufficient in the control of porous characteristic parameters, so it is difficult to quantitatively study the low-amplitude ultrasonic wave propagation law of the porous rock from the perspective of pore characteristic parameters with a relatively high precision. Moreover, although the physical parameters and distribution form of pores can be controlled to a certain extent by using artificial pouring synthetic processing method and 3D printing by traditional modeling, these preparation methods are difficult to realize in the case of a large number of pores, random spatial distribution and complex pore size distribution. Meanwhile, these sample preparation methods are difficult to realize repeatable, high-precision and mass production for rocks with complex porous media. Therefore, in order to quantitatively study the wave propagation law of the porous rock waves from the perspective of pore parameters and improve a researching accuracy in this aspect, it is necessary to innovate the sample preparation method.

SUMMARY

In order to solve the problems in the prior art, the present invention provides a method for preparing a porous rock, and also provides a test method for quantitatively researching a low-amplitude ultrasonic propagation law of the rock by using the rock sample prepared by the method for preparing the porous rock. By utilizing the advantages of programming software and 3D printing technology, characteristics of rock-like porous media can be quantitatively controlled according to requirements of the test, and samples with low discreteness can be quickly and accurately prepared in batches by using 3D printing. The low-amplitude ultrasonic wave test is carried out on the rock-like porous media rock after stress and temperature of the prepared rock sample, which can realize the quantitative study of the low-amplitude ultrasonic wave propagation law of the rock-like porous media rock.

A method for preparing a porous rock according to the present invention comprises the following steps:

S1: establishing a three-dimensional model data plane: establishing a three-dimensional model with arbitrary spatial distribution of pores with a set shape based on a MATLAB programming tool, and acquiring a file containing sample model three-dimensional data plane information;

S2: converting the three-dimensional data plane into a three-dimensional solid: converting the sample model three-dimensional data plane of the file into the three-dimensional solid, and processing the three-dimensional solid to obtain a qualified sample three-dimensional solid model containing pores; and S3: performing slicing and 3D printing processing of the model: slicing the processed file of the sample three-dimensional solid model, setting a non-porous medium part in the sample to be cured and a porous medium part to be non-cured, acquiring a code file which is recognized by a 3D printer, and then inputting the code file to the 3D printer for 3D printing, and finally obtaining the rock-like porous medium sample for experimental testing.

Further, the rock-like porous medium sample is a rock sample, and in the step S1, the MATLAB programming tool is preset with a series of parameters for controlling the rock sample, and through the setting of the parameters, a corresponding STL format file of the sample model three-dimensional data plane is obtained to realize accurate quantitative control of the porous medium characteristic of the rock sample, wherein the parameters comprise a porosity, a pore size range, a pore shape, a pore type and spatial distribution of pores of the rock sample.

Further, in the step S1, the shape of the pore comprises a spherical shape, a coin shape, an ellipsoid shape, a polyhedron shape or an irregular anisotropic shape, and when the shape of the pore is the spherical shape, a method for generating the sample model three-dimensional data plane comprises the following steps:

A1: starting, and acquiring the input parameters for controlling the rock sample;

A2: generating three-dimensional data of the rock sample with corresponding shape and size;

A3: generating corresponding spherical pore spherical data according to the input parameters;

A4: calculating a porosity, determining whether the porosity is within a set interval, if yes, deriving porous data and then executing step A5, if not, returning to executing step A3; and A5: exporting the porous data, and writing the three-dimensional data of the rock sample and the porous data into an STL format file, and ending.

As a further improvement of the present invention, the sample model three-dimensional data plane comprises randomly distributed pores, the shape of the rock sample is a cylinder, and a method for generating the sample model three-dimensional data plane with randomly distributed pores comprises the following steps:

A110: acquiring the parameters for controlling the rock sample input by a user, wherein the parameters comprise a cylinder size parameter, and spherical pore size range, number and porosity parameters of the rock sample;

A111: calculating a volume according to the cylinder size parameter of the rock sample and generating corresponding three-dimensional data of the sample model;

A112: generating porous data of globules with specified number and distribution globular porous data internally by analogy based on a function that radius distribution of spherical pores is Gaussian distribution;

A113: calculating a volume of the globules according to a formula for calculating the volume of the globules, dividing the volume of the globules by the volume of the cylinder to obtain the porosity, and determining whether the porosity is within an error interval, if so, executing step A114, and if not, returning to step A112;

A114: outputting qualified porous data and cylinder data in a specified file format; and A115: according to XYZ coordinate values of the globules, establishing spherical data at the position, and writing the cylinder data and the data of the globules into one STL format file.

Further, in the step A113, if the porosity is not within the error interval for a set number of times, A110 is re-executed to re-generate the sample model three-dimensional data plane.

As another improvement of the present invention, the sample model three-dimensional data plane comprises pores distributed in a joint plane, the shape of the rock sample is a cylinder, and a method for generating the sample model three-dimensional data plane with pores distributed in a joint plane comprises the following steps:

A120: acquiring the parameters for controlling the rock sample input by a user, wherein the parameters a cylinder size parameter, spherical pore size range, number, porosity, distance of globules in XYZ coordinates and distance of the whole joint surface in Z coordinate of the rock sample;

A121: generating a coordinate of an initial spherical pore and random one radius value within a determined radius range, and recording the coordinate of the initial pore and radius data;

A122: calculating a volume according to the cylinder size parameter of the rock sample and generating the corresponding three-dimensional data of the sample model;

A123: sequentially generating a single joint, a single joint plane and a plurality of joint planes with an initial globule as a center, and then storing the coordinate and the radius data in the file in turn;

A124: returning the data in the file to one matrix, calculating a volume of the globules according to the radius data of the globules stored in the matrix, dividing the volume of the globules by the volume of the cylinder to obtain the porosity, and determining whether the porosity is within the error interval, if so, executing step A125, and if not, re-executing steps A121, A123 and A124 in turn to re-generate the data of the globules and calculate the porosity;

A125: outputting the qualified porous data and cylinder data in a specified file format for subsequent data processing; and A126: according to XYZ coordinate values of the globules, establishing spherical data at the position, and writing the cylinder data and the data of the globules into one STL format file.

Further, in the step S2, the output STL format file is processed by Solidworks software, the STL format file is imported into Solidworks in the form of a solid, the three-dimensional data plane of the file is converted into the three-dimensional solid, and then a cylinder solid and a globule solid are subjected to Boolean subtraction operation to obtain the qualified sample three-dimensional solid model containing pores.

Further, in the step S3, the STL format file processed in the step S2 is imported into slicing software for the slicing process of 3D printing, in the slicing process, a G-code recognized by the 3D printer is created, and finally, the 3D printer performs printing operation according to the sliced file, and finally the porous rock sample for experimental testing is manufactured.

The present invention also provides a method for quantitatively researching low-amplitude wave propagation, wherein a rock sample prepared by the method for preparing the porous rock is used to carry out quantitative test on a wave propagation law of the rock.

Further, the testing method is as follows: designing and quantitatively changing a characteristic parameter of the rock pore by adopting the method for preparing the test sample according to the present invention, preparing rock samples with the same pore space distribution and different porosity, or preparing rock samples with the same pore space distribution, the same pore type and the same porosity but different pore size ranges according to test requirements.

The existing test devices comprising computer, ultrasonic transmitter and receiver, oscilloscope, static electro-hydraulic servo pressure test system and constant temperature and humidity test box are used to quantitatively test and analyze the low-amplitude ultrasonic wave propagation law of the rock sample under stress and temperature. The indoor low-amplitude ultrasonic wave propagation test is respectively carried out on these rock samples is carried out after different axial pressures and different temperature treatment. According to the test data obtained under different test conditions, the influence of the rock pore characteristic parameter on the low-amplitude ultrasonic wave velocity change law, transmission coefficient change law, frequency spectrum change law and attenuation coefficient change law of the rock sample under different axial pressures and temperature is quantitatively analyzed.

Compared with the prior art, the present invention has the beneficial effects as follows: the programming technology and the 3D printing technology are integrated in the present invention, so that the efficiency of preparing the rock-like porous medium sample can be improved by utilizing the advantages of the programming technology and the 3D printing technology, the discreteness between the samples can be reduced, and the high-precision and repeatable batch customization of the rock-like porous media can be realized. It is also possible to prepare rock-like porous media meeting different requirements by quantitatively controlling the parameters such as the size of the rock sample, the distribution of internal pore size, the size of porosity and an inclination angle of joint planes, so as to improve the accuracy of quantitative research on the low-amplitude ultrasonic wave propagation law of the rock by pore parameters of the rock-like porous media under different test conditions.

Through the rock samples obtained by controlling the parameters of the rock sample, the influence of the porous parameters on the low-amplitude ultrasonic wave propagation law of the rock sample under different axial pressures or different temperature treatment can be studied, comprising longitudinal wave and shear wave velocity change law, transmission coefficient change law, frequency spectrum change law and attenuation coefficient change law of the rock sample, the quantitative analysis of the rock wave propagation law test under different test conditions is realized, the blank of quantitative analysis of the change of pore medium parameters on the test study of the low-amplitude ultrasonic wave propagation law of the rock under different test conditions is filled, and great scientific research value is realized.

BRIEF DESCRIPTION OF THE DRAWINGS

In order to illustrate the technical solutions in the present invention or in the prior art more clearly, the drawings used in the embodiments or the prior art will be briefly described below. Obviously, the drawings in the following description are merely some embodiments in the present invention. For those of ordinary skills in the art, other drawings may also be obtained based on these drawings without going through any creative work.

DETAILED DESCRIPTION

Unless otherwise defined, all the technical and scientific terms used in the present invention have the same meanings as those commonly understood by those skilled in the art of the present invention. Terms used herein in the specification of the present invention are for the purpose of describing specific embodiments only and are not intended to limit the present invention. The terms "including" and "provided with" and any variations thereof in the specification and claims as well as the above drawings of the present invention are intended to cover non-exclusive inclusion.

The terms "first", "second" and the like in the specification and claims as well as the above drawings of the present invention are used to distinguish different objects, and are not necessarily used to describe a specific sequence. Reference in the present invention to "an embodiment" means that a particular feature, structure, or characteristic described in connection with the embodiment may be included in at least one embodiment of the present invention. The appearances of the phrase in various places in the specification are not necessarily all referring to the same embodiment, nor are separate or alternative embodiments mutually exclusive of other embodiments. It is to be expressly and implicitly understood by those skilled in the art that the embodiments described in the present invention may be combined with other embodiments without conflict.

In order to make those skilled in the art better understand the solutions of the present invention, the technical solutions in the embodiments of the present invention will be described clearly and completely with the attached drawings.

Figure 1:
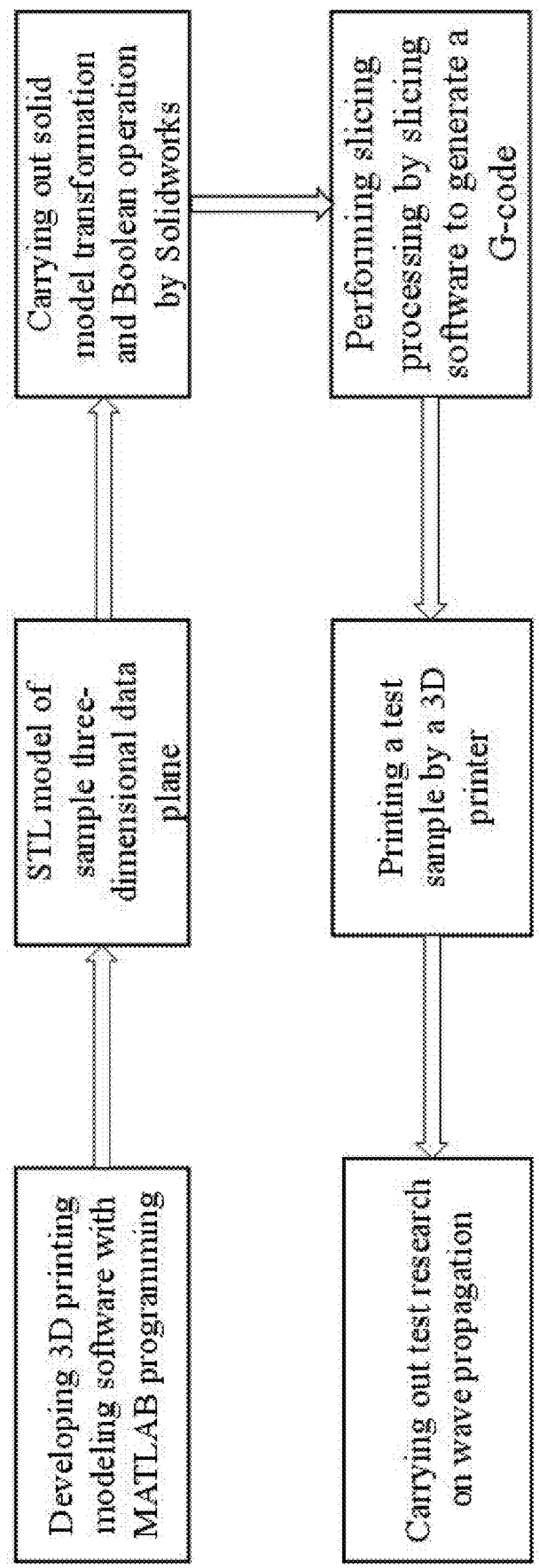
FIG. 1 is a flow chart of a method according to an embodiment of the present invention.

As shown in FIG. 1, as the optimal embodiment of the present invention, a method for preparing a porous rock of the present invention comprises the following steps:

S1: establishing a three-dimensional model data plane: according to the present invention, developing a 3D printing modeling tool based on MATLAB programming, and then establishing a three-dimensional model with arbitrary spatial distribution of pores with a set shape through the 3D printing modeling tool, and acquiring an STL format file containing sample model three-dimensional data plane information;

S2: converting the three-dimensional data plane into a three-dimensional solid: converting the sample model three-dimensional data plane of the STL format file into the three-dimensional solid by using Solidworks software, and carrying out Boolean operation processing on the three-dimensional solid to obtain a qualified sample three-dimensional solid model containing pores; and S3: performing slicing and 3D printing processing of the model: slicing the processed file of the sample three-dimensional solid model, acquiring a G-code file which is recognized by a 3D printer, and then inputting the code file to the 3D printer for 3D printing, and finally obtaining the rock-like porous medium sample for experimental testing.

Finally, the rock-like porous media prepared by the present invention is used to perform quantitative researching on the wave propagation.

The steps of the present invention are described in detail below with reference to the specific embodiments.

Preferably, the rock-like porous medium sample is a rock sample. Certainly, different media can be prepared by 3D printing technology according to different materials.

In the step S1, the sample model three-dimensional data plane is established.

In the embodiment, the MATLAB programming tool is preset with a series of parameters for controlling the rock sample, and through the setting of the parameters, the corresponding STL format file of the sample model three-dimensional data plane is obtained to realize accurate quantitative control of the porous medium characteristic of the rock sample, wherein the parameters comprise a porosity, a pore size range, and spatial distribution of pores of the rock sample.

For the convenience of the test, the shape of the rock sample in this embodiment is a cylinder, and the shape of the pore in this embodiment is spherical. Of course, according to different test items, the shape of the rock sample and the shape of the pore may be adjusted to other shapes as required, such as a coin shape, an ellipsoid shape, a polyhedron or irregular polyhedron shape, an irregular body shape, or the like.

Figure 4:
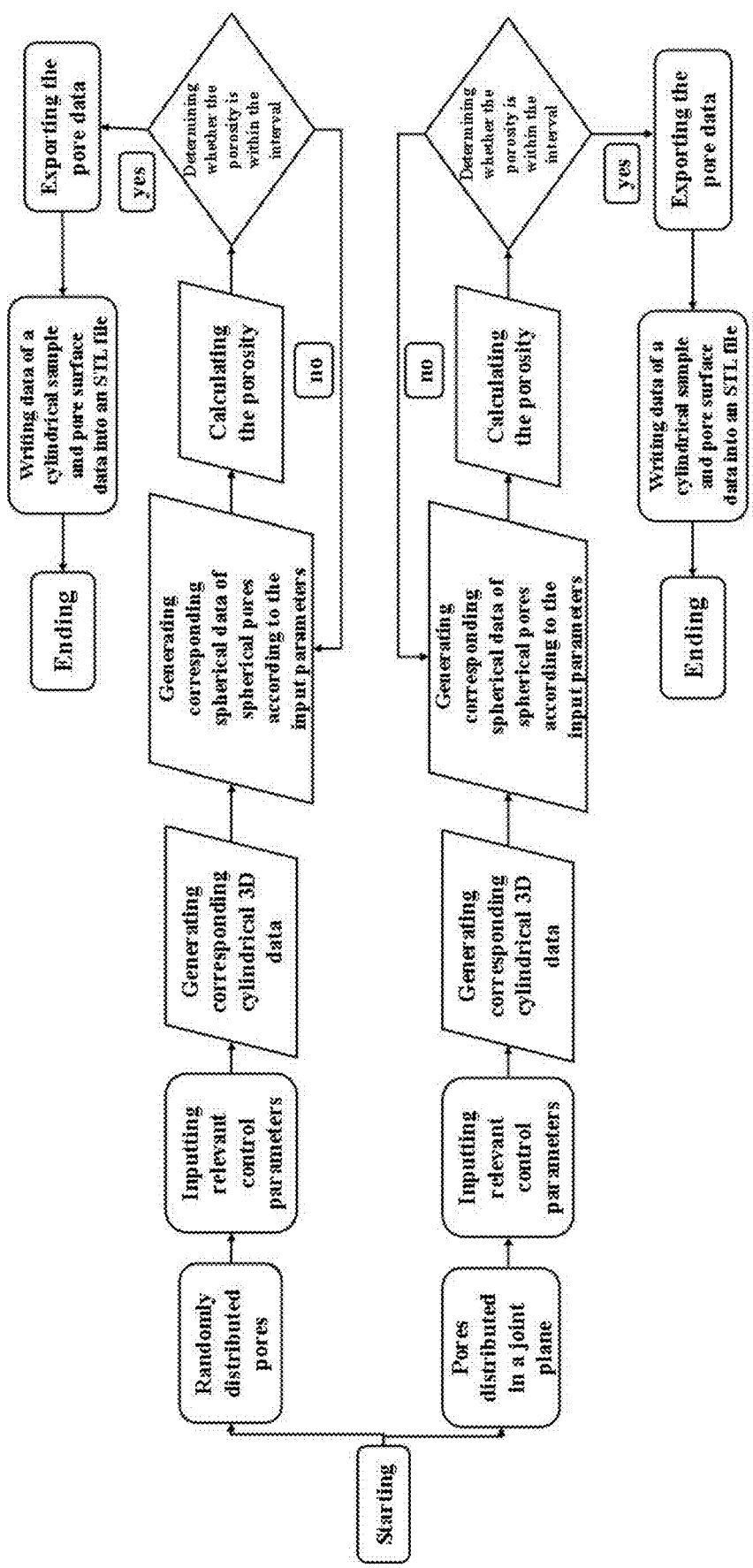
FIG. 4 is a flow chart of a method for generating a sample model three-dimensional data plane according to the present invention.

As shown in FIG. 4, a method for generating the sample model three-dimensional data plane comprises the following steps:

A1: starting, acquiring a pore distribution mode, and then acquiring the input parameters for controlling the rock sample;

A2: generating three-dimensional data of the rock sample with corresponding shape and size;

A3: generating corresponding spherical pore spherical data according to the input parameters;

A4: calculating a porosity, determining whether the porosity is within a set interval, if yes, deriving porous data and then executing step A5, if not, returning to executing step A3; and A5: exporting the porous data, and writing the three-dimensional data of the rock sample and the porous data into an STL format file, and ending.

As shown in FIG. 4, as a first embodiment of the present invention, the sample model three-dimensional data plane in this embodiment adopts randomly distributed pores, and a method for generating the sample model three-dimensional data plane with randomly distributed pores comprises the following steps.

In A110, the parameters for controlling the rock sample input by a user are acquired, wherein the parameters comprise a cylinder size parameter, and spherical pore size range, number and porosity parameters of the rock sample.

Figure 2:
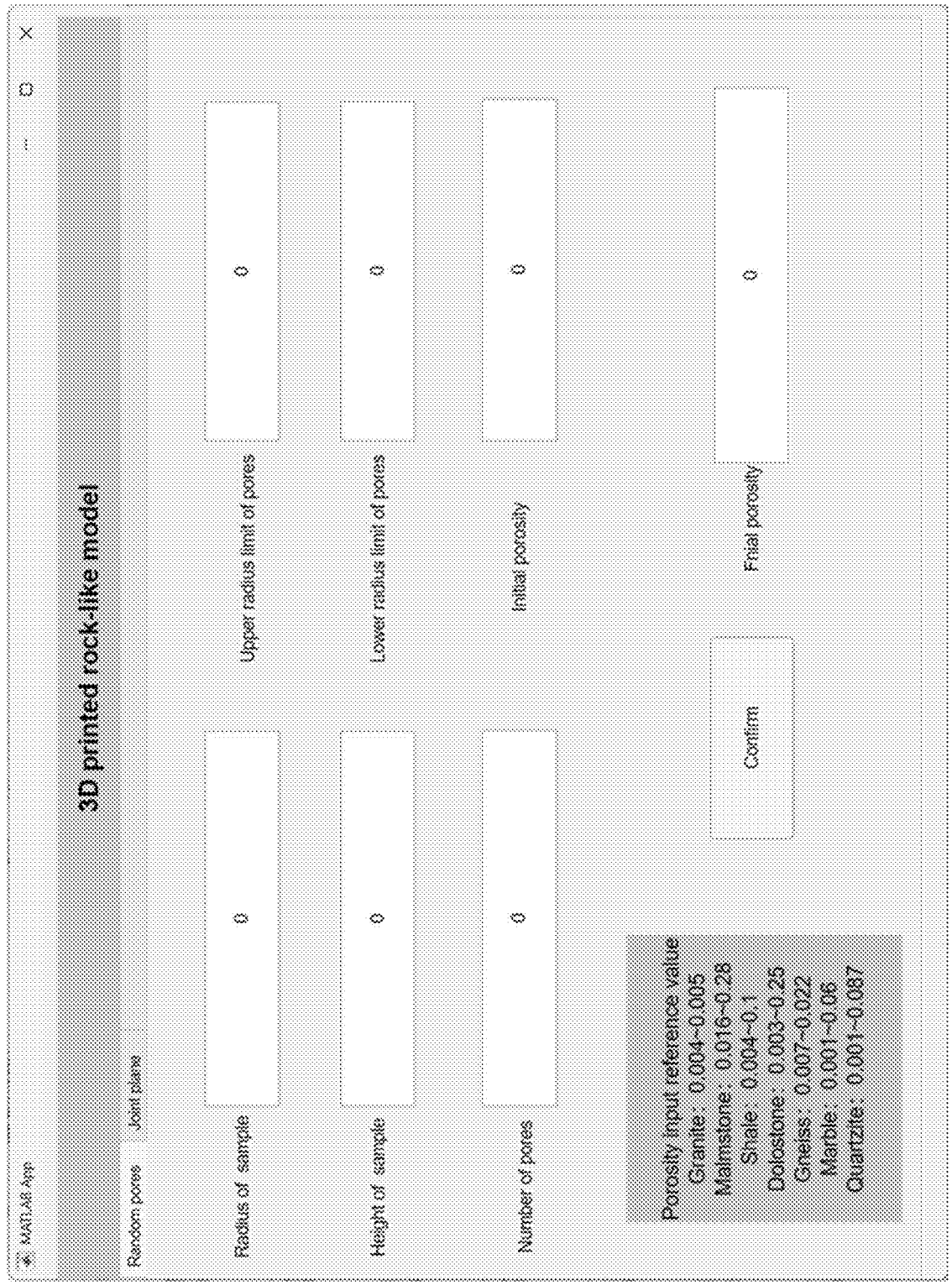
FIG. 2 is an interface diagram of parameter input software for randomly distributed pores according to the present invention.

A user-operated software interface is shown in FIG. 2. The user may set a radius of the rock sample, a height of the rock sample, an upper radius limit of the pore, a lower radius limit of the pore, a number of pores and a porosity in the software interface. In a lower left corner of the software interface, a card of porosity input reference value is provided, and some commonly used rock porosity may refer to this card. After relevant parameters are entered according to the test requirements, a conform button is clicked to start to run the generation.

In A111, a volume is calculated according to the cylinder size parameter of the rock sample and corresponding three-dimensional data of the sample model are generated.

In this embodiment, the MATLAB programming tool may establish a formula for calculating the volume of the cylinder and a relevant code for constructing a three-dimensional data plane of the cylinder. This step can calculate the volume of the cylinder according to the size parameters of the cylinder input by the user and generate the three-dimensional data of the cylindrical sample model.

In A112, porous data of globules with specified number and distribution globular porous data are generated internally by analogy based on a function that radius distribution of spherical pores is Gaussian distribution.

The function that the radius distribution of spherical pores is Gaussian distribution is established, and a cycle is established at the same time. In the cycle, XYZ coordinates of one spherical pore inside the cylinder corresponding to the radius of the spherical pore are generated in turn every time according to the coordinate parameters of the cylinder. When the generated spherical pore data are greater than 2, it is determined whether the pores overlap. If it is determined that the pores overlap, globule coordinates of the latest cycle are re-generated until the globules do not overlap with each other. After determining that the requirements are met, next cycle is carried out to generate the porous data of globules with specified number and distribution globular porous data internally by analogy.

In A113, a volume of the globules is calculated according to a formula for calculating the volume of the globules, the volume of the globules is divided by the volume of the cylinder to obtain the porosity, and it is determined whether the porosity is within an error interval, if so, step A114 is executed, and if not, step A112 is re-executed.

In this embodiment, the MATLAB programming tool calculates the volume of the globules according to the radius data of the globules stored in the matrix and the formula for calculating the volume of the globules, and then divides the volume of the globules by the volume of the cylinder to obtain one porosity, and meanwhile, establishes an error interval of the porosity.

It is determined whether the porosity is within the error interval. If the porosity is within the error interval, next step is executed. If the porosity is not within the error interval, a new cycle is started, wherein a number of cycles is set. Within the specified number of cycles, step A112 and step A113 will be repeatedly executed to realize the functions of re-generating the data of the globules and calculating the porosity.

If the data of the globules that meet the porosity error is generated within the specified number of cycles, next step will be executed. If the data of the globules that meet the porosity error is not generated, the program will prompt the user to re-input the control parameters and return to step A110 to re-generate the sample model.

In A114, qualified porous data and cylinder data are output in TXT file format and xlsx file format.

In A115, according to XYZ coordinate values of the globules, spherical data are established at the position, and the cylinder data and the data of the globules are written into one STL format file.

As shown in FIG. 4, as a second embodiment of the present invention, the sample model three-dimensional data plane adopts pores distributed in a joint plane, and a method for generating the sample model three-dimensional data plane with pores distributed in a joint plane comprises the following steps.

In A120, the parameters for controlling the rock sample input by a user are acquired, wherein the parameters a cylinder size parameter, spherical pore size range, number, porosity, distance of globules in XYZ coordinates and distance of the whole joint surface in Z coordinate of the rock sample.

Figure 3:
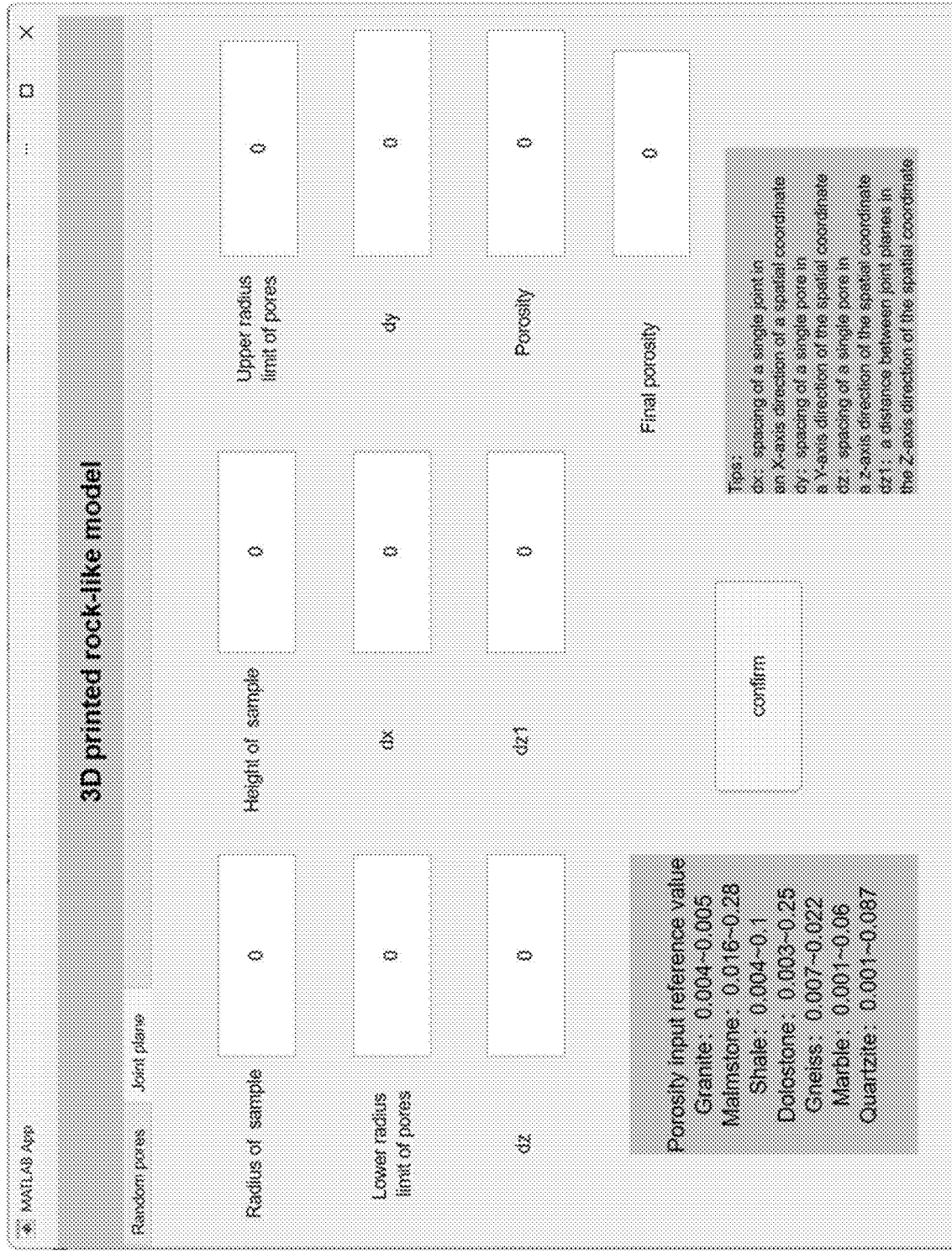
FIG. 3 is an interface diagram of parameter input software for pores distributed in a joint plane according to the present invention.

A user-operated software interface is shown in FIG. 3. The user may set a radius of the rock sample, a height of the rock sample, an upper radius limit of the pore, a lower radius limit of the pore, dx, dy, dz, dz1 and a porosity in the software interface. In a lower right corner of the software interface, a prompt card for the four parameters of dx, dy, dz and dz1 is provided, wherein dx represents spacing of a single joint in an X-axis direction of a spatial coordinate; dy represents spacing of a single pore in a Y-axis direction of the spatial coordinate; dz represents spacing of a single pore in a z-axis direction of the spatial coordinate; and dz1 represents a distance between joint planes in the Z-axis direction of the spatial coordinate. In a lower left corner of the software interface, a card of porosity input reference value is provided, and some commonly used rock porosity may refer to this card. After relevant parameters are entered according to the test requirements, a conform button is clicked to start to run the generation.

In A121, a coordinate of an initial spherical pore and random one radius value within a determined radius range are generated, and an empty txt file is created at the same time to record the coordinate of the initial pore and radius data.

In A122, a volume is calculated according to the cylinder size parameter of the rock sample and the corresponding three-dimensional data of the sample model is generated.

In this embodiment, the MATLAB programming tool will establish a formula for calculating the volume of the cylinder and a relevant code for constructing a three-dimensional data plane of the cylinder, and write the data into the txt file. This step can calculate the volume of the cylinder according to the size parameters of the cylinder input by the user and generate the three-dimensional data of the cylindrical sample model.

In A123, a single joint, a single joint plane and a plurality of joint planes are sequentially generated with an initial globule as a center, and then the coordinate and the radius data are stored in the file in turn.

In this embodiment, a cycle of generating the single joint, the single joint plane and the plurality of joint planes with the initial globule as the center is established in turn. First, starting from the initial globule, the single joint is generated by cyclically changing a YZ distance of a midpoint of the pore of the globule in space, then the whole joint plane is generated by changing an X coordinate of the whole joint, and finally the plurality of joint planes in the cylindrical sample are generated by changing a Z coordinate of the joint plane. Finally, the coordinate and radius data are stored in the txt file in turn.

In A124, the data in the file are returned to one matrix, a volume of the globules is calculated according to the radius data of the globules stored in the matrix, the volume of the globules is divided by the volume of the cylinder to obtain the porosity, and it is determined whether the porosity is within the error interval, if so, step A125 is executed, and if not, steps A121, A123 and A124 are re-executed in turn to re-generate the data of the globules and calculate the porosity according to a set number of cycles and within a specified number of cycles.

If the data of the globules that meet the porosity error is generated within the specified number of cycles, next step will be executed. If the data of the globules that meet the porosity error is not generated, the program will prompt the user to re-input the control parameters and return to step A120 to re-generate the sample model.

In A125, the qualified porous data and cylinder data are outputted in an xlsx file format for subsequent data processing.

In A126, according to XYZ coordinate values of the globules, spherical data are established at the position, and then two cycles are carried out in turn to write the cylinder data and the data of the globules into one STL format file.

In the step S2, the output STL format file is processed by Solidworks software, the STL format file is imported into Solidworks in the form of a solid, the three-dimensional data plane of the file is converted into the three-dimensional solid, and then a cylinder solid and a globule solid are subjected to Boolean subtraction operation to obtain the qualified sample three-dimensional solid model containing pores.

Figure 5:
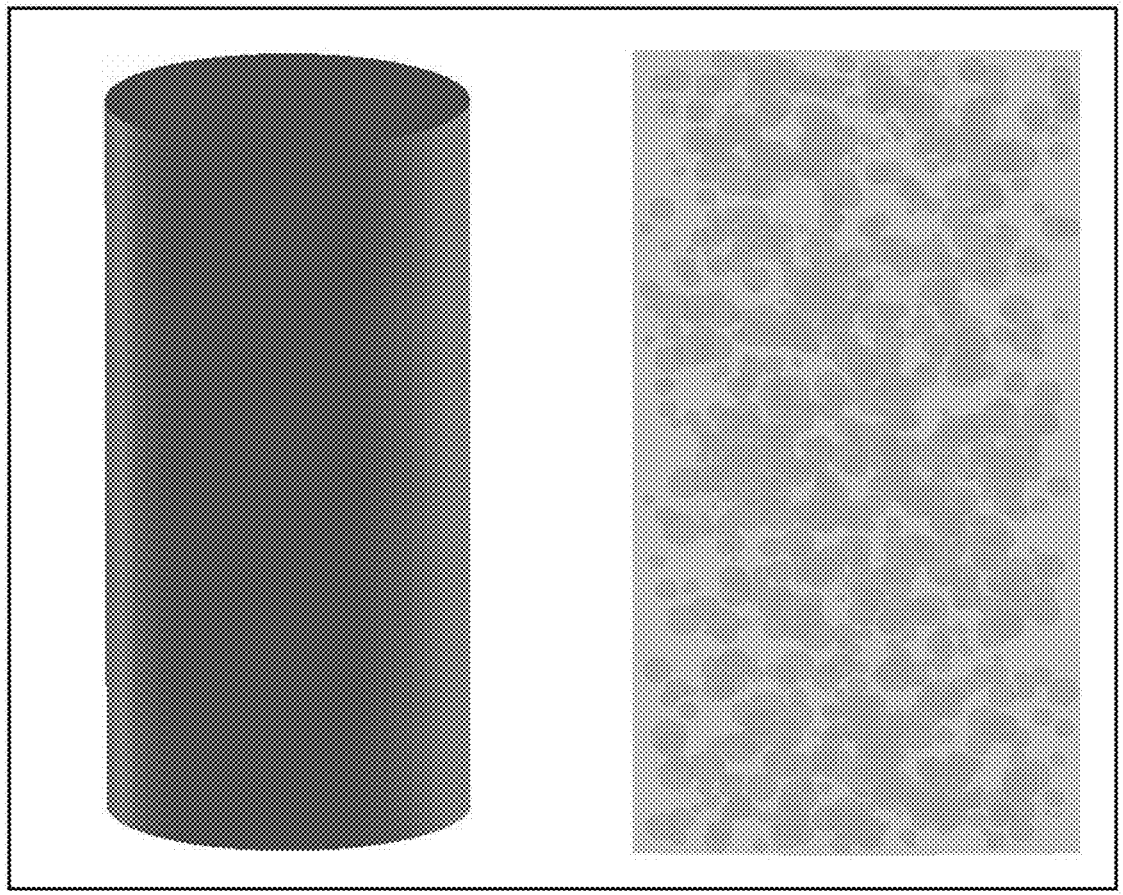
FIG. 5 is a schematic diagram of a cylindrical sample three-dimensional solid model generated based on the sample model three-dimensional data plane with randomly distributed pores according to the present invention.
Figure 6:
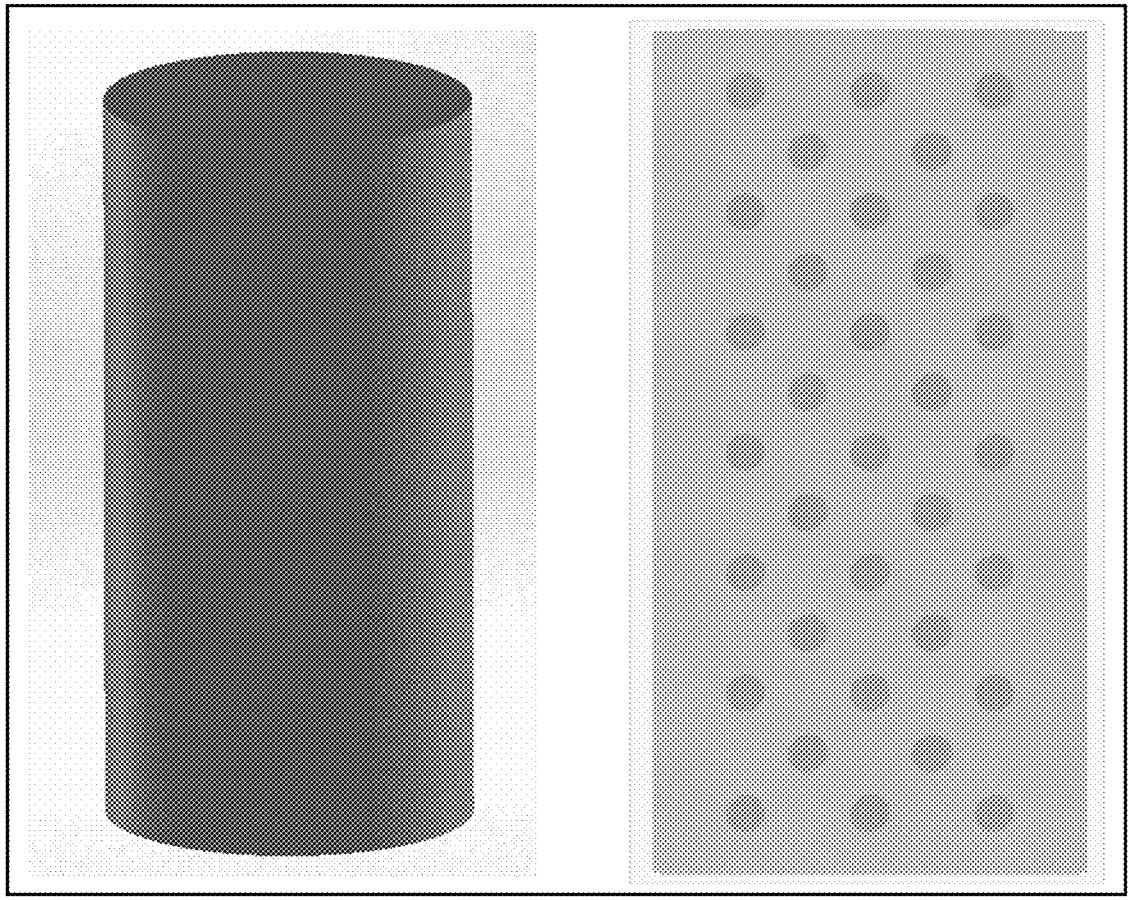
FIG. 6 is a schematic diagram of a cylindrical sample three-dimensional solid model generated based on the sample model three-dimensional data plane with pores distributed in a joint plane.
Figure 7:
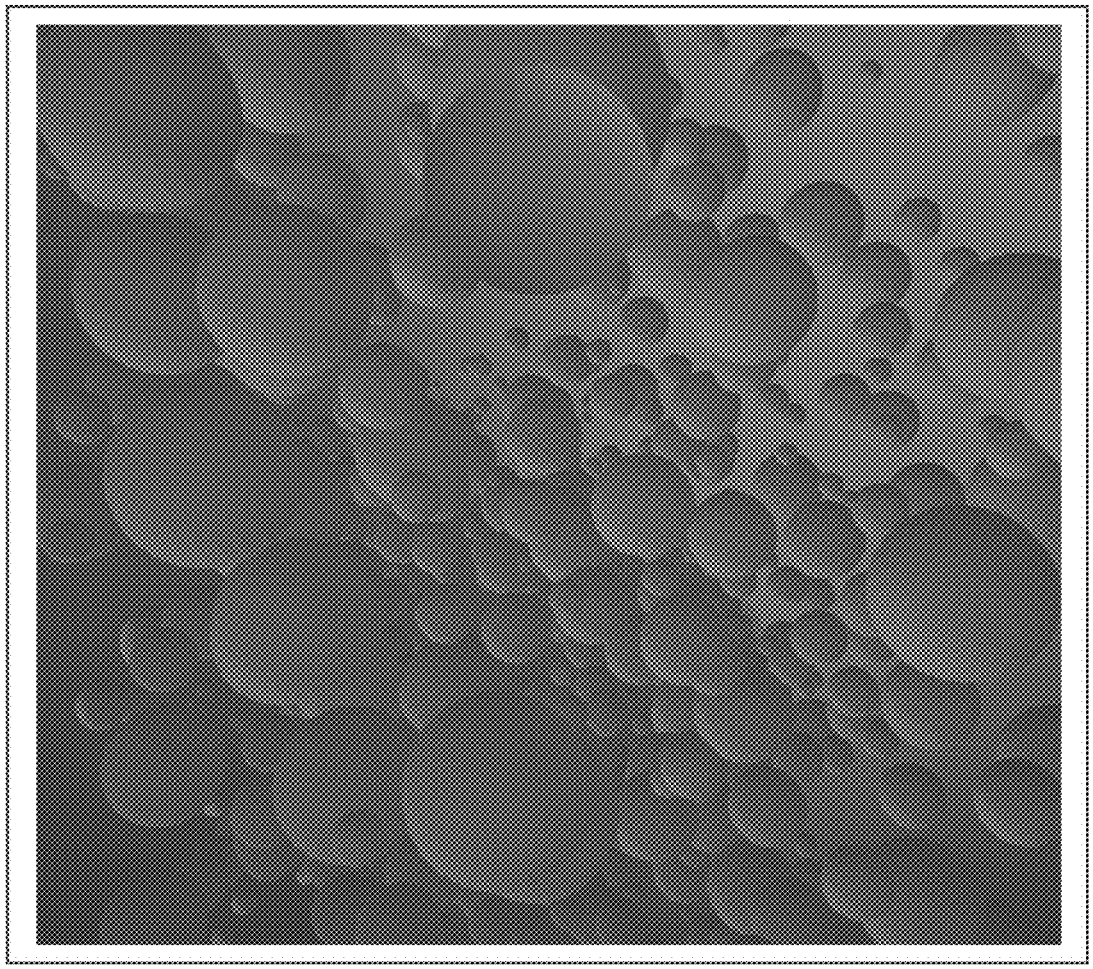
FIG. 7 is a schematic diagram of pore distribution in the cylindrical sample with randomly distributed pores according to the present invention.
Figure 8:
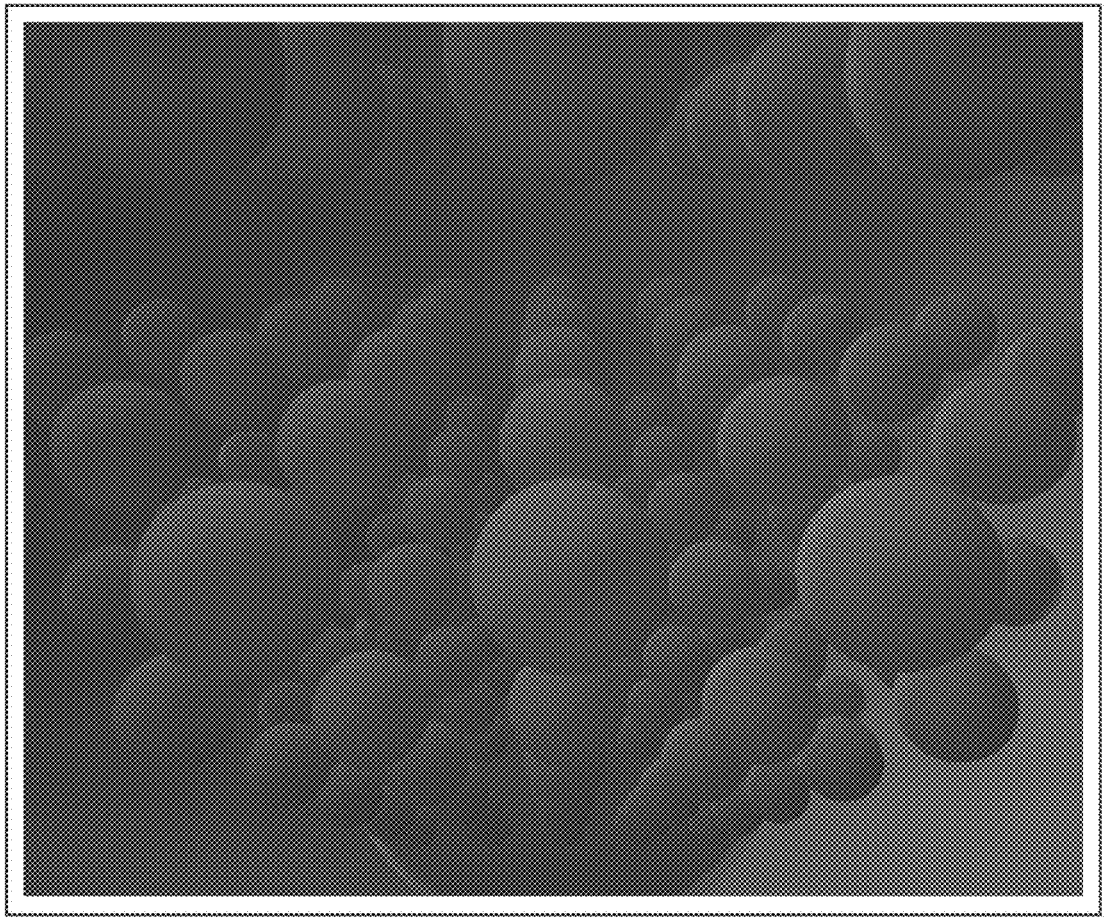
FIG. 8 is a schematic diagram of pore distribution in the cylindrical sample with pores distributed in a joint plane according to the present invention.

The rock sample generated by the first embodiment of the present invention is shown in FIG. 5, and the internal pore distribution is shown in FIG. 7. The rock sample generated by the second embodiment of the present invention is shown in FIG. 6, and the internal pore distribution is shown in FIG. 8.

In step S3, slicing and 3D printing are carried out on the model.

Figure 9:
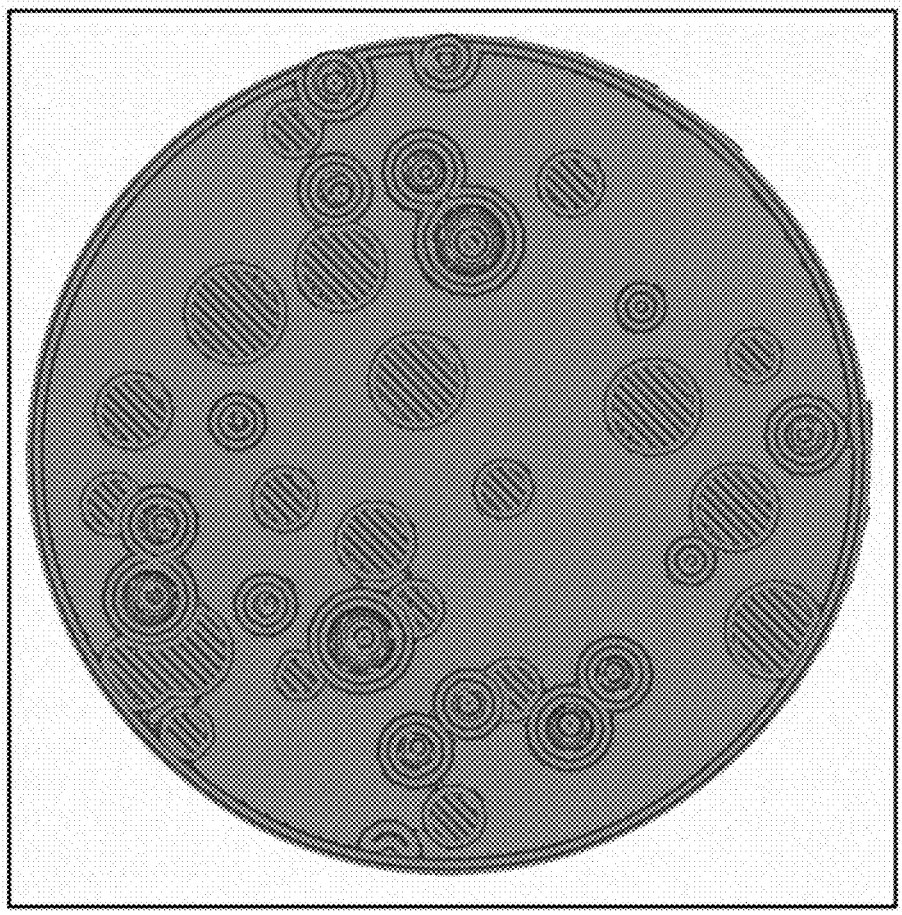
FIG. 9 is a sectional drawing of a cylindrical sample three-dimensional solid model with randomly distributed pores after being sliced by slicing software.
Figure 10:
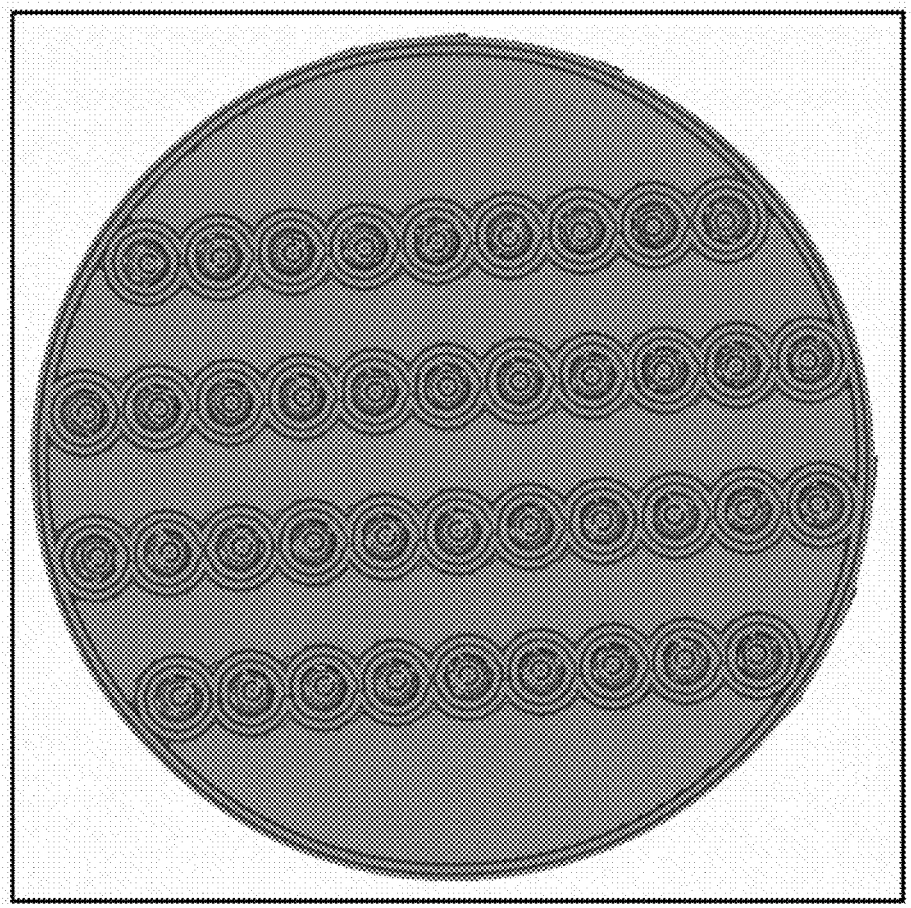
FIG. 10 is a sectional drawing of a sample three-dimensional solid model with pores distributed in a joint plane after being sliced by slicing software.

Further, in the step S3, the STL format file processed in the step S2 is imported into slicing software for the slicing process of 3D printing, in the slicing process, a G-code recognized by the 3D printer is created, and finally, the 3D printer performs printing operation according to the sliced file, and finally the rock sample for testing is manufactured. In this embodiment, the sectional drawing of the three-dimensional solid model of the cylindrical sample three-dimensional solid model with randomly distributed pores after being sliced by slicing software is shown in FIG. 9, and sectional drawing of a sample three-dimensional solid model with pores distributed in a joint plane after being sliced by slicing software is shown in FIG. 10.

Specifically, this embodiment imports the processed STL format file into the slicing software, sets relevant parameters for the slicing software, such as a printer type and parameters, selects a 3D printer model to be used, and sets relevant parameters, such as a printing speed and a layer height. For material selection, printing materials to be used are specified, such as PLA, ABS, PETG, or the like. For a supporting structure, it is determined whether a supporting structure is needed to support a suspended or cantilever part. For a filling density, a filling density inside the model is selected, which is usually expressed in a way of percentage ratio. For temperature setting, temperatures of a printing head and a heating bed are set. For layer resolution, a thickness of each printed layer is determined, which is usually expressed in millimeters. For a printing speed, a moving speed of the printing head is adjusted to affect the printing speed and quality. For support and attachment, parameters of support and base are configured to ensure that the model adheres to a printing base. For path planning, a movement path of the printing head is set to minimize printing time and reduce vibration during the movement. For other advanced options, other specific settings are performed as needed, such as printing sequence, automatic stop, or the like. Slicing is carried out after setting, and previewing is performed after slicing to make sure that the slicing is layered correctly, and then a slicing file, which is a G-code file is exported after confirmation. The file contains instructions executed by the printer. The generated G-code is transmitted to the printer, and the printing task is started. During the printing process, the operation of the printer is monitored in real time. After the printing is completed, the test samples are taken out and necessary post-processing is carried out, such as cleaning the surface and removing the support.

The preparation method of the present invention comprises the overall process from programming and modeling to outputting the original STL format file, then processing the STL format file, and finally printing the product. According to the preparation method of the present invention, not only can the advantages of programming and 3D printing technology be utilized to improve the sample preparation efficiency and reduce the discreteness between the samples, but also parameters such as the sample size, the internal pore size distribution, the porosity and the inclination angle of the joint planes of the rock samples can be quantitatively controlled. By controlling the parameters of the rock samples, the low-amplitude ultrasonic wave characteristics of the rocks with different porosity under different axial pressures and different temperatures are studied, including longitudinal and shear wave velocity change law, transmission coefficient change law, frequency spectrum change law and attenuation coefficient change law of the rocks.

The present invention also provides a rock sample prepared by the method for preparing the porous rock, which is used for quantitative test of the rock wave propagation.

The rock sample prepared by the sample preparation method combining the MATLAB programming technology and the 3D printing technology can quantitatively study the low-amplitude ultrasonic wave propagation law of the rock by quantitatively controlling the porosity of the rock, the size range of the pore and the inclination angle of the joint planes.

Specific test 1: study on a low-amplitude ultrasonic wave characteristics propagation law of rock-like porous media rock samples with different porosity under the condition of axial stress change (the spatial distributions of all the rock pores in the test examples mentioned in the present invention are random distribution).

Figure 11:
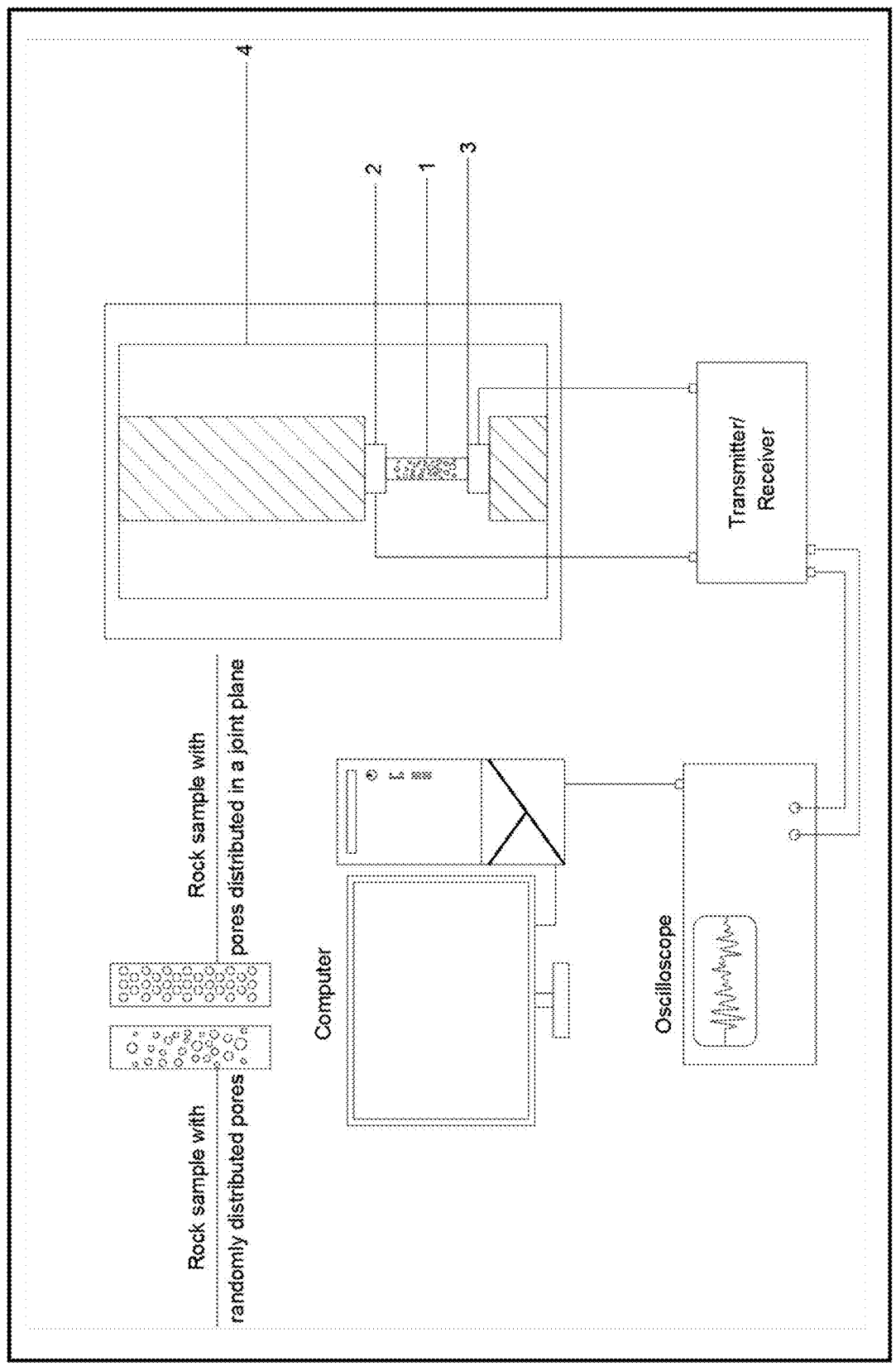
FIG. 11 is a schematic structural diagram of a rock wave propagation test device at different axial stresses.

As shown in FIG. 11, the test device of the present invention comprises a computer, an ultrasonic transmitter and receiver, an oscilloscope and a pressure testing machine 4. Firstly, rock samples with different porosity are prepared according to the preparation method of the present invention, and these samples are numbered. Next, a transmitting probe 2 and a receiving probe 3 of the ultrasonic transmitter and receiver are fixed on the pressure testing machine 4 to ensure that before a rock sample 1 is placed between the transmitting probe 2 and the receiving probe 3, a layer of coupling agent is evenly coated on a top and a bottom of the sample 1, the transmitting probe 2 and the receiving probe 3 to ensure that the top and the bottom of the rock sample 1 are fully attached to the transmitting probe 2 and the receiving probe 3 respectively, and then the rock sample 1 coated with the coupling agent is placed between the transmitting probe 2 and the receiving probe 3. After the sample is assembled, the low-amplitude ultrasonic wave propagation test is carried out under an axial pressure value set in the test solution.

Starting from zero, the axial pressure value is gradually increased, and meanwhile, an appropriate ultrasonic frequency is selected, and the ultrasonic transmitter and receiver are enabled to let the ultrasonic wave pass through the rock sample 1, and an ultrasonic waveform received by the receiving probe 3 is recorded. After completing the ultrasonic wave propagation test of a single sample under all set different stress conditions, next sample is tested until the low-amplitude ultrasonic wave propagation test under different axial pressures specified in the test plan is completed. After the whole test is completed, all the data are stored to the computer for subsequent analysis.

As a preferred embodiment of the present invention, this embodiment extracts an arrival time t of the first ultrasonic wave (that is, the first wave) from the recorded ultrasonic waveform, which reflects a propagation time of the ultrasonic wave between the rock sample and a sensor, and calculates wave velocities of P wave and S wave of all the rock samples under different axial pressures by using the formula v=l/t. A detailed analysis of these wave velocities can reveal the wave velocity change law of samples with the same porosity under different axial pressures, the wave velocity change law of the samples under the same axial pressure increased with the porosity, and comparison of the influence of the axial pressure change on the wave velocity of the samples with different porosity. From images and data recorded in the test, the initial ultrasonic wave peak amplitude transmitted by 3D printed complete rock samples (i.e., the porosity is 0) and the initial ultrasonic peak amplitude transmitted by 3D printed rock samples with different porosity, which are recorded as $A_0$ and $A_i$ respectively. Based on the amplitude $A_0$ of the complete sample, the transmission coefficients of all the rock samples under different axial pressures are calculated by using the formula $T_r=A_i/A_0$, wherein $T_r$ is the transmission coefficient of the rock. A detailed analysis of the transmission coefficient can reveal the transmission coefficient change law of samples with the same porosity under different axial pressures, the transmission coefficient change law of the samples under the same axial pressure increased with the porosity, and comparison of the influence of the axial pressure change on the transmission coefficient of the samples with different porosity.

Figure 13:
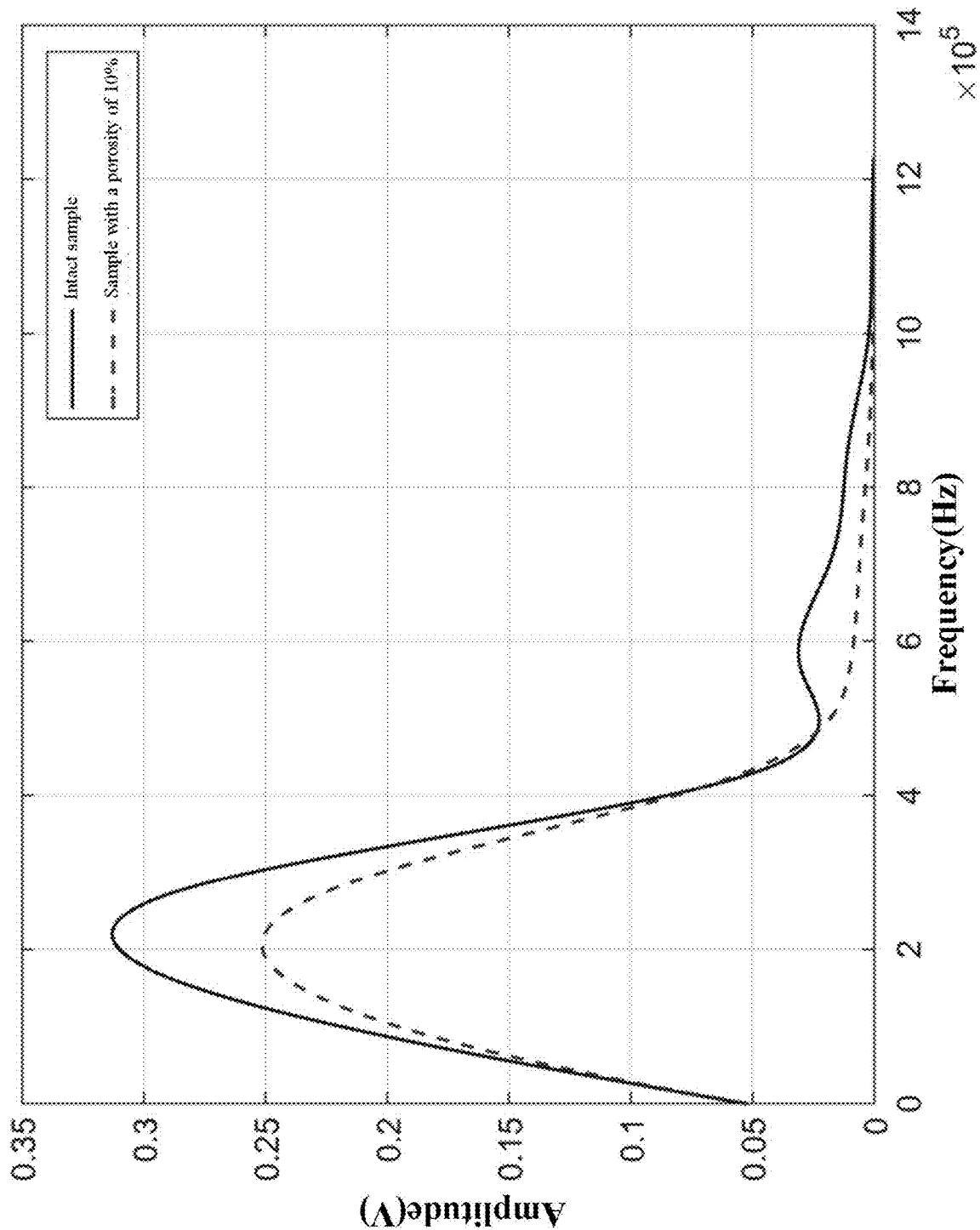
FIG. 13 is a spectrum change diagram of a complete sample when an axial pressure is 0 and the rock sample with a porosity of 10% at a main frequency of 200 kHz.
Figure 14:
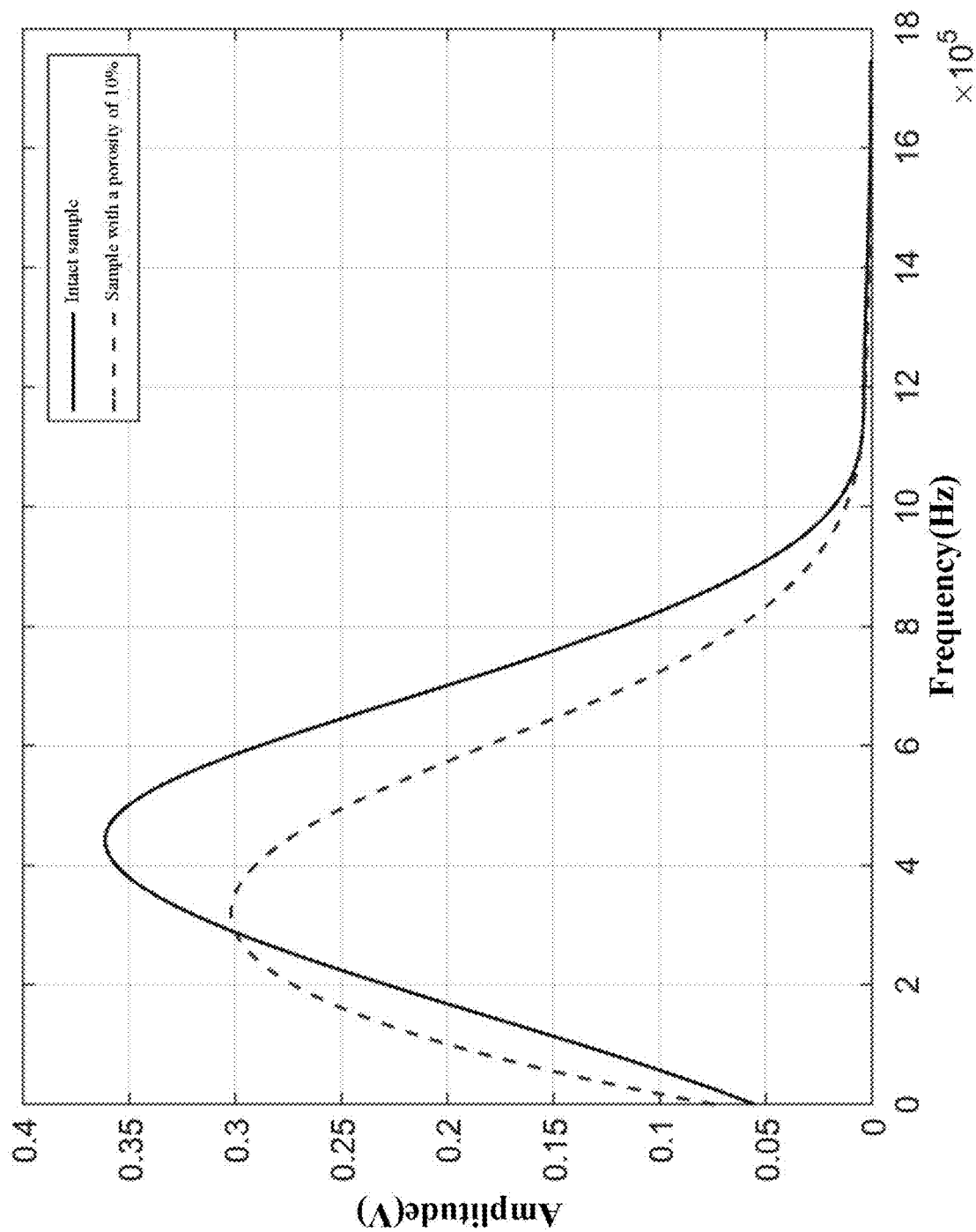
FIG. 14 is a spectrum change diagram of a complete sample when the axial pressure is 0 and the rock sample with a porosity of 10% at a main frequency of 500 kHz.

The low-amplitude ultrasonic wave propagation test data of the rock sample are imported into MATLAB or Python, the first complete waveform data are intercepted, the data are normalized, an appropriate window function after normalization is selected, the test data are subjected to windowing, and fast Fourier transform (FFT) is carried out on the data after windowing. After the FFT, the original waveform data in time domain will be converted into data in frequency domain, and data of positive axis will be intercepted for drawing, so as to understand the distribution and change law of transmitted wave energy in frequency range. As shown in FIG. 13 and FIG. 14, it can be seen that the amplitude of the complete sample in the frequency domain is about 22% higher than that of the sample with a porosity of 10% when the main frequency of the P-wave ultrasonic wave is 200 kHz, and is about 20% higher than that of the sample with a porosity of 10% when the main frequency of the P-wave ultrasonic wave is 500 kHz. Meanwhile, the attenuation coefficient of the rock sample can be calculated by the following formula In $$\left(\frac{A_1(f)}{A_2(f)}\right) = \ln\left(\frac{G_1(\chi)}{G_2(\chi)}\right) + \frac{\pi\chi}{c_2 Q_2}f,$$

wherein $A_1(f)$ and $A_2(f)$ are the spectral amplitudes obtained by performing FFT on the cone-shaped initial transmission ultrasonic waves with reference to pure aluminum samples and porous rock samples respectively; $c_2$ refers to phase wave velocities of a reference sample and a jointed rock sample; $Q_2$ represents quality factors of reference pure aluminum samples and porous rock samples; $\chi$ is an ultrasonic wave moving path length; $G_1$ and $G_2$ respectively represent geometrical factors representing reference pure aluminum samples and porous rock samples respectively; and f is the main frequency of the ultrasound wave. A detailed analysis of the calculated attenuation coefficient can reveal the low-amplitude ultrasonic wave propagation attenuation law of samples with the same porosity under different axial pressures, the attenuation law of the low-amplitude ultrasonic wave propagation of the samples under the same axial pressure increased with the porosity, and comparison of the influence of the axial pressure change on the attenuation law of the low-amplitude ultrasonic wave propagation of the samples with different porosity.

Specific test 2: study on a low-amplitude ultrasonic propagation law of rock-like porous media rock samples with different porosity after temperature processing (the spatial distributions of all the rock pores in the test examples mentioned in the present invention are random distribution).

Figure 12:
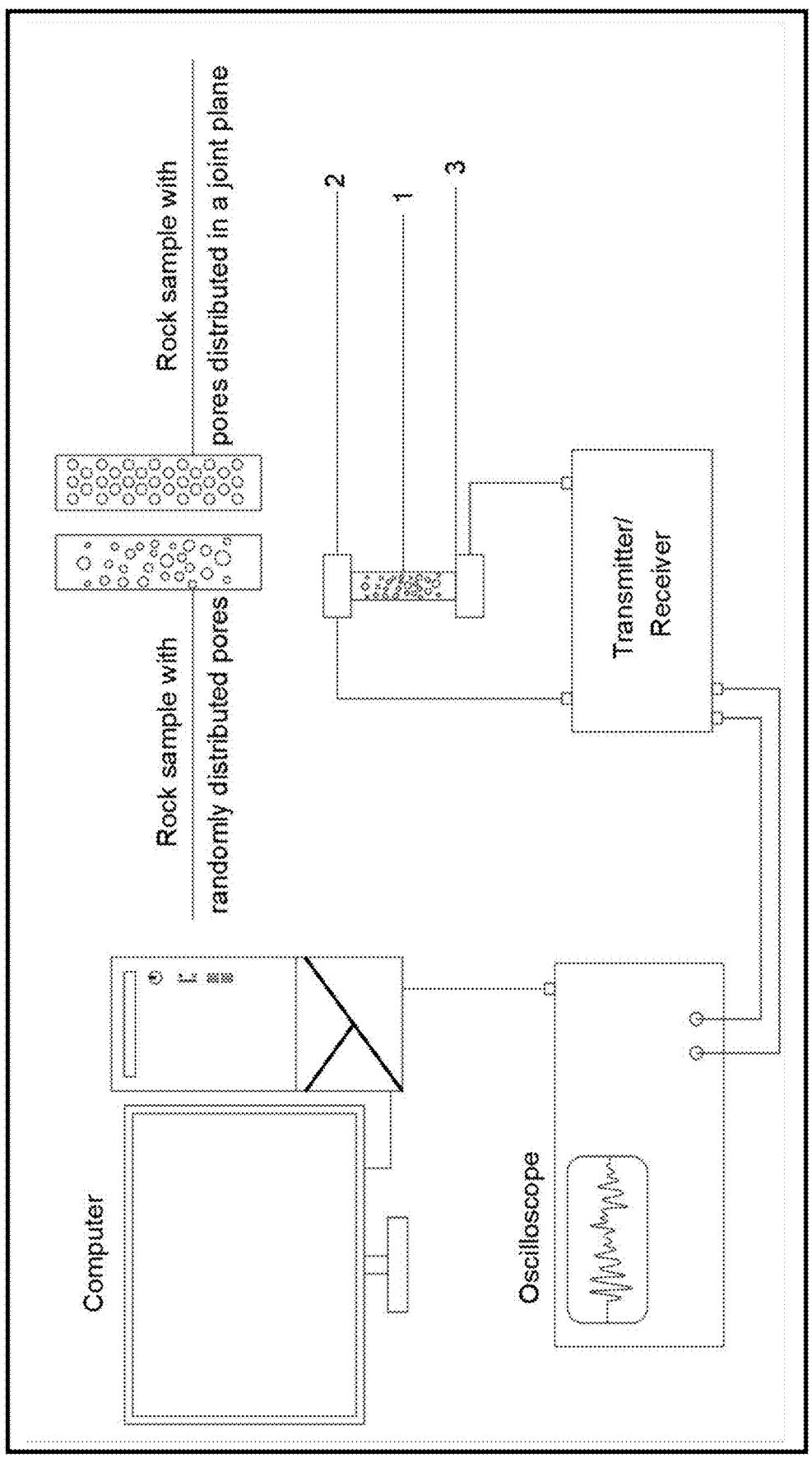
FIG. 12 is a schematic structural diagram of a rock wave propagation test device after different temperature treatment.

As shown in FIG. 12, the test device of the present invention comprises a computer, an ultrasonic transmitter and receiver, and an oscilloscope. Firstly, rock samples 1 with different porosity are prepared according to the above three steps, and each rock sample 1 is numbered. Next, these rock samples 1 with different porosity are subjected to temperature processing. Before the rock sample 1 is placed between a transmitting probe 2 and a receiving probe 3 of the ultrasonic transmitter and receiver, a layer of coupling agent is evenly coated on a top and a bottom of the sample 1, the transmitting probe 2 and the receiving probe 3 to ensure that the top and the bottom of the rock sample 1 are fully attached to the transmitting probe 2 and the receiving probe 3 respectively, and then the rock sample coated with the coupling agent is placed between the two probes. After the sample is assembled, an appropriate ultrasonic frequency is selected, and the ultrasonic transmitter and receiver are enabled to let the ultrasonic wave pass through the rock sample 1, and an ultrasonic waveform and data received by the receiving probe 3 after the temperature processing are recorded. After completing the ultrasonic test of all the samples at a certain temperature, next temperature processing is carried out. The ultrasonic test steps are repeated until all the low-amplitude ultrasonic wave propagation tests after the temperature processing specified in the test plan are completed, and all the data are stored to the computer for subsequent analysis after the whole test is completed.

As a preferred embodiment of the present invention, an arrival time t of the first ultrasonic wave (that is, the first wave) is extracted from the recorded ultrasonic waveform, which reflects a propagation time of the ultrasonic wave between the rock sample and a transducer, and wave velocities of P wave and S wave of all the rock samples under different axial pressures are calculated by using the formula v=l/t. A detailed analysis of the wave velocities of the samples can reveal the wave velocity change law of samples with the same porosity increased with the temperature, the wave velocity change law of the samples under the same temperature processing increased with the porosity, and comparison of the influence of the temperature change on the wave velocity of the samples with different porosity. From images and data recorded in the test, the initial ultrasonic wave peak amplitude transmitted by 3D printed complete rock samples (i.e., the porosity is 0) and the initial ultrasonic peak amplitude transmitted by 3D printed rock samples with different porosity, which are recorded as $A_0$ and $A_i$ respectively. Based on the amplitude $A_0$ of the complete sample, the transmission coefficients of all the rock samples under different axial pressures are calculated by using the formula $T_r=A_i/A_0$, wherein $T_r$ is the transmission coefficient of the rock. A detailed analysis of the transmission coefficient can reveal the transmission coefficient change law of samples with the same porosity under different temperature, the transmission coefficient change law of the samples under the same processing increased with the porosity, and comparison of the influence of the temperature change on the transmission coefficient of the samples with different porosity.

The test data of the rock sample are imported into MATLAB or Python, the first complete waveform data are intercepted, the data are normalized, an appropriate window function after normalization is selected, the test data are subjected to windowing, and fast Fourier transform (FFT) is carried out on the data after windowing. After the FFT, the original waveform data in time domain will be converted into data in frequency domain, and data of positive axis will be intercepted for drawing, so as to understand the distribution and change law of transmitted wave energy in frequency range. Meanwhile, the attenuation coefficient of the rock sample can be calculated by the following formula the following formula In $$\left(\frac{A_1(f)}{A_2(f)}\right) = \ln\left(\frac{G_1(\chi)}{G_2(\chi)}\right) + \frac{\pi\chi}{c_2 Q_2} f,$$

wherein $A_1(f)$ and $A_2(f)$ are the spectral amplitudes obtained by performing FFT on the cone-shaped initial transmission ultrasonic waves with reference to pure aluminum samples and porous rock samples respectively; $c_2$ refers to phase wave velocities of a reference sample and a jointed rock sample; $Q_2$ represents quality factors of reference pure aluminum samples and porous rock samples; $\chi$ is an ultrasonic wave moving path length; $G_1$ and $G_2$ respectively represent geometrical factors representing reference pure aluminum samples and porous rock samples respectively; and f is the main frequency of the ultrasound wave. A detailed analysis of the calculated attenuation coefficient can reveal the ultrasonic wave propagation attenuation law of samples with the same porosity after different temperature processing, the attenuation law of the low-amplitude ultrasonic wave propagation of the samples after temperature processing increased with the porosity, and comparison of the influence of different temperature processing on the attenuation law of the low-amplitude ultrasonic wave propagation of the samples with different porosity.

According to the above embodiments, it can be known that the programming technology and the 3D printing technology are integrated in the present invention, so that the efficiency of preparing the rock-like porous medium sample can be improved by utilizing the advantages of the programming technology and the 3D printing technology, the discreteness between the samples can be reduced, and the high-precision and repeatable batch customization of the rock-like porous media can be realized. It is also possible to prepare rock-like porous media meeting different requirements by quantitatively controlling the parameters such as the size of the rock sample, the distribution of internal pore size, the size of porosity and an inclination angle of joint planes, so as to improve the accuracy of quantitative research on the low-amplitude ultrasonic wave propagation law of the rock by pore parameters of the rock-like porous media under different test conditions.

Through the rock samples obtained by controlling the parameters of the rock sample, the influence of the porous parameters on the low-amplitude ultrasonic wave propagation law of the rock sample under different stress or different temperature treatment can be studied, comprising longitudinal wave and shear wave velocity change law, transmission coefficient change law, frequency spectrum change law and attenuation coefficient change law of the rock sample, the quantitative analysis of the rock wave propagation law test under different test conditions is realized, the blank of quantitative analysis of the change of pore medium parameters on the test study of the low-amplitude ultrasonic wave propagation law of the rock sample under different test conditions is filled, and great scientific research value is realized.

The specific embodiments described above are the preferred embodiments of the present invention, and are not intended to limit the specific implementation scope of the present invention. The scope of the present invention includes but is not limited to the specific embodiments, and all equivalent changes made according to the present invention are within the protection scope of the present invention.

What is claimed is:

1. A method for preparing a porous rock, comprising the following steps:
    S1: establishing a three-dimensional model data plane: establishing a three-dimensional model with arbitrary spatial distribution of pores with a set shape based on a MATLAB programming tool, and acquiring a file containing sample model three-dimensional data plane information;
    S2: converting the three-dimensional data plane into a three-dimensional solid: converting the sample model three-dimensional data plane of the file into the three-dimensional solid, and processing the three-dimensional solid to obtain a qualified sample three-dimensional solid model containing pores; and
    S3: performing slicing and 3D printing processing of the model: slicing the processed file of the sample three-dimensional solid model, setting a non-porous medium part in the sample to be cured and a porous medium part to be non-cured, acquiring a code file which is recognized by a 3D printer, and then inputting the code file to the 3D printer for 3D printing, and finally obtaining the rock-like porous medium sample for experimental testing;
    wherein, the rock-like porous medium sample is a rock sample, and in the step S1, the MATLAB programming tool is preset with a series of parameters for controlling the rock sample, and through the setting of the parameters, a corresponding STL format file of the sample model three-dimensional data plane is obtained to realize accurate quantitative control of the porous medium characteristic of the rock sample, wherein the parameters comprise a porosity, a pore size range, a pore shape, a pore type and spatial distribution of pores of the rock sample; and
    in the step S1, the shape of the pore comprises a spherical shape, a coin shape, an ellipsoid shape, a polyhedron shape or an irregular anisotropic shape, and when the shape of the pore is the spherical shape, a method for generating the sample model three-dimensional data plane comprises the following steps:
    A1: starting, and acquiring the input parameters for controlling the rock sample;
    A2: generating three-dimensional data of the rock sample with corresponding shape and size;
    A3: generating corresponding spherical pore spherical data according to the input parameters;
    A4: calculating a porosity, determining whether the porosity is within a set interval, if yes, deriving porous data and then executing step A5, if not, returning to executing step A3; and A5: exporting the porous data, and writing the three-dimensional data of the rock sample and the porous data into an STL format file, and ending.

2. The method for preparing the porous rock according to claim 1, wherein the sample model three-dimensional data plane comprises randomly distributed pores, the shape of the rock sample is a cylinder, and a method for generating the sample model three-dimensional data plane with randomly distributed pores comprises the following steps:

A110: acquiring the parameters for controlling the rock sample input by a user, wherein the parameters comprise a cylinder size parameter, and spherical pore size range, number and porosity parameters of the rock sample;

A111: calculating a volume according to the cylinder size parameter of the rock sample and generating corresponding three-dimensional data of the sample model;

A112: generating porous data of globules with specified number and distribution globular porous data internally by analogy based on a function that radius distribution of spherical pores is Gaussian distribution;

A113: calculating a volume of the globules according to a formula for calculating the volume of the globules, dividing the volume of the globules by the volume of the cylinder to obtain the porosity, and determining whether the porosity is within an error interval, if so, executing step A114, and if not, returning to step A112;

A114: outputting qualified porous data and cylinder data in a specified file format; and A115: according to XYZ coordinate values of the globules, establishing spherical data at the position, and writing the cylinder data and the data of the globules into one STL format file.

3. The method for preparing the porous rock according to claim 2, wherein in the step A113, if the porosity is not within the error interval for a set number of times, A110 is re-executed to re-generate the sample model three-dimensional data plane.

4. The method for preparing the porous rock according to claim 1, wherein the sample model three-dimensional data plane comprises pores distributed in a joint plane, the shape of the rock sample is a cylinder, and a method for generating the sample model three-dimensional data plane with pores distributed in a joint plane comprises the following steps:

A120: acquiring the parameters for controlling the rock sample input by a user, wherein the parameters a cylinder size parameter, spherical pore size range, number, porosity, distance of globules in XYZ coordinates and distance of the whole joint surface in Z coordinate of the rock sample;

A121: generating a coordinate of an initial spherical pore and random one radius value within a determined radius range, and recording the coordinate of the initial pore and radius data;

A122: calculating a volume according to the cylinder size parameter of the rock sample and generating the corresponding three-dimensional data of the sample model;

A123: sequentially generating a single joint, a single joint plane and a plurality of joint planes with an initial globule as a center, and then storing the coordinate and the radius data in the file in turn;

A124: returning the data in the file to one matrix, calculating a volume of the globules according to the radius data of the globules stored in the matrix, dividing the volume of the globules by the volume of the cylinder to obtain the porosity, and determining whether the porosity is within the error interval, if so, executing step A125, and if not, re-executing steps A121, A123 and A124 in turn to re-generate the data of the globules and calculate the porosity;

A125: outputting the qualified porous data and cylinder data in a specified file format for subsequent data processing; and A126: according to XYZ coordinate values of the globules, establishing spherical data at the position, and writing the cylinder data and the data of the globules into one STL format file.

5. The method for preparing the porous rock according to claim 1, wherein in the step S2, the output STL format file is processed by Solidworks software, the STL format file is imported into Solidworks in the form of a solid, the three-dimensional data plane of the file is converted into the three-dimensional solid, and then a cylinder solid and a globule solid are subjected to Boolean subtraction operation to obtain the qualified sample three-dimensional solid model containing pores.

6. The method for preparing the porous rock according to claim 5, wherein in the step S3, the STL format file processed in the step S2 is imported into slicing software for the slicing process of 3D printing, in the slicing process, a G-code recognized by the 3D printer is created, and finally, the 3D printer performs printing operation according to the sliced file, and finally the porous rock sample for experimental testing is manufactured.

7. A method for quantitatively researching low-amplitude wave propagation, wherein a rock sample prepared by the method for preparing the porous rock according to claim 2 is used to carry out quantitative test on a wave propagation law of the porous rock.

8. The method for quantitatively researching low-amplitude wave propagation according to claim 7, wherein the method comprises the following processing steps:

designing and quantitatively changing a characteristic parameter of the rock pore, preparing rock samples with the same pore space distribution and different porosity, or preparing rock samples with the same pore space distribution, the same pore type and the same porosity but different pore size ranges according to test requirements; and carrying out quantitative test researching on a low-amplitude ultrasonic wave propagation law of the rock sample under stress and temperature by using a test device;

wherein the quantitative test researching comprises:

respectively carrying out indoor low-amplitude ultrasonic wave propagation tests of the rock sample after being processed at different axial pressures and/or different temperatures; and according to the test data obtained under different conditions, quantitatively analyzing rock pore characteristic parameters to research change laws of the rock sample at different axial pressures and/or temperatures, wherein the change laws comprise: one or more of a wave velocity change law, a transmission coefficient change law, a frequency spectrum change law and an attenuation coefficient change law.

* * * * *